(12) United States Patent
Dadheech et al.

(10) Patent No.: US 8,029,870 B2
(45) Date of Patent: Oct. 4, 2011

(54) METHOD OF COATING FUEL CELL COMPONENTS FOR WATER REMOVAL

(75) Inventors: Gayatri Vyas Dadheech, Rochester Hills, MI (US); Youssef M. Mikhail, Sterling Heights, MI (US); Mahmoud H. Abd Elhamid, Grosse Pointe Woods, MI (US); Jeffrey M. Guzda, Spencerport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 601 days.

(21) Appl. No.: 12/053,897

(22) Filed: Mar. 24, 2008

(65) Prior Publication Data

US 2009/0238989 A1    Sep. 24, 2009

(51) Int. Cl.
*C08J 7/18*    (2006.01)
(52) U.S. Cl. ......................... 427/489; 427/452
(58) Field of Classification Search .................. 427/489, 427/452
See application file for complete search history.

(56) References Cited

U.S. PATENT DOCUMENTS

| | | | |
|---|---|---|---|
| 5,529,856 A * | 6/1996 | Petri et al. | 429/477 |
| 7,141,271 B2 * | 11/2006 | Barbezat et al. | 427/115 |
| 2004/0023078 A1 * | 2/2004 | Rosenflanz et al. | 428/702 |
| 2006/0028145 A1 * | 2/2006 | Mohamed et al. | 315/111.21 |
| 2006/0263670 A1 * | 11/2006 | Tanno | 429/38 |
| 2007/0031721 A1 * | 2/2007 | Winter et al. | 429/38 |
| 2008/0003436 A1 * | 1/2008 | Haack et al. | 428/426 |

FOREIGN PATENT DOCUMENTS

CN    1688735 A    10/2005
WO    WO 2006/048650    *    5/2006

OTHER PUBLICATIONS

Mascia et al. "Dense Outer Layers Formed by Plasma Treatment of Silica Coatings Produced by the Sol-Gel Method" Journal of Materials Science 32 (1997) 667-674.*
Babayan et al. "Deposition of Silicon Dioxide Films with a Non-Equilibrium Atmospheric-Pressure Plasma Jet" Plasma Sources Sci. Technol. 10 (2001) 573-578.*

* cited by examiner

*Primary Examiner* — Dah-Wei Yuan
*Assistant Examiner* — Robert S Walters, Jr.
(74) *Attorney, Agent, or Firm* — Fraser Clemens Martin & Miller LLC; J. Douglas Miller

(57) ABSTRACT

A method for coating a fuel cell component is provided. The method includes the steps of providing a fuel cell component, and forming a coating on a surface of the fuel cell component with a plasma jet. The step of forming the coating may include applying a coating precursor to a surface of the fuel cell component and then reacting the coating precursor with the plasma jet to form the coating. The step of forming the coating may also include growing the coating on the surface of the fuel cell component by delivering the plasma jet containing the coating precursor.

19 Claims, No Drawings

US 8,029,870 B2

METHOD OF COATING FUEL CELL COMPONENTS FOR WATER REMOVAL

FIELD OF THE INVENTION

The present disclosure relates to a method for producing a fuel cell component, and more particularly to a method for coating a fuel cell plate and facilitating an effective removal of water therefrom.

BACKGROUND OF THE INVENTION

Fuel cells have been proposed as a clean, efficient and environmentally responsible power source for electric vehicles and various other applications. A plurality of fuel cells can be stacked together in series to form a fuel cell stack capable of supplying a desired amount of electricity. The fuel cell stack has been identified as a potential alternative to the traditional internal-combustion engine used in automobiles.

One type of fuel cell is known as a proton exchange membrane (PEM) fuel cell. The PEM fuel cell typically includes three basic components: a cathode, an anode, and an electrolyte membrane. The electrolyte membrane is generally sandwiched between the cathode and the anode. The fuel cell generally also includes porous conductive materials, known as gas diffusion media, which distribute reactant gases over the surfaces of the cathode and anode. The reactant gases typically include hydrogen gas and oxygen can be supplied from air, for example. The hydrogen is delivered to the anode and is converted to protons. The protons travel through the electrolyte to the cathode. The electrons in the anode flow through an external circuit to the cathode, where they recombine with the oxygen and the protons to form water. The electron flow through the external circuit allows the fuel cell to be employed as a power source.

The cathode, anode, and electrolyte membrane are generally interposed between a pair of electrically conductive fuel cell plates to complete the PEM fuel cell. The plates serve as current collectors for the anode and cathode, and have appropriate flow channels and openings formed therein for distributing the fuel cell's reactant gases over the surfaces of the respective cathode and anode. The flow channels generally define lands therebetween that are in electrical contact with the gas diffusion media of the fuel cell. Typically, the plates also include inlet and outlet apertures which, when aligned in a fuel cell stack, form internal supply and exhaust manifolds for directing the fuel cell's reactant gases and liquid coolant to and from, respectively, the anodes and cathodes.

During operation of the fuel cell, water from both the electrochemical fuel cell reaction and external humidification may enter the flow channels. The water is typically forced through the flow channels by the reactant gas, the pressure of which is a primary mechanism for water removal from the flow channels. When the reactant gas flow is not sufficient, however, such as when the fuel cell is operating at a lower power output, water can accumulate or "stagnate". Stagnant water can block flow channels and reduce the overall efficiency of the fuel cell. Stagnant water may also increase flow resistance in particular flow channels and divert the reactant gases to neighboring channels, resulting in a localized starvation of the fuel cell. The accumulation of water can also lead to a higher rate of carbon corrosion and a poorer durability under freezing conditions. Water accumulation can eventually lead to a failure of the fuel cell.

It is known in the art to employ fuel cell plates having at least one of a hydrophilic coatings and a hydrophobic coating that facilitates the removal of water from the fuel cell. The fuel cell may also include other means of drainage, such as a foam, a wick, a mesh, or other water removing structures adapted to facilitate removal of water from the fuel cell plates.

The fuel cell plates are typically coated, for example, by at least one of spraying, brushing, rolling, printing, and dipping. One known high performance coating is X-TEC® high performance inert nanoparticle coating, commercially available from Nano-X, GmbH in Saarbruecken-Guedingen, Germany. Certain types of coatings, such as various silica-based coatings, are produced by known sol-gel techniques. Vacuum assisted techniques such as physical vapor deposition (PVD), chemical vapor deposition (CVD), atomic layer deposition (ALD), and plasma-enhanced chemical vapor deposition (PECVD) methods for coating fuel cell plates are also known. Controlling coating characteristics such as thickness, morphology, and contact angle can be difficult with many of the known coating methods. Certain of the known methods are also prohibitively expensive.

There is a continuing need for a method of coating fuel cell components with at least one of a hydrophilic coating and a hydrophobic coating to facilitate a removal of water from the fuel cell. Desirably, the method is less complex, less expensive, and provides a coating of sufficient durability to be used in the fuel cell.

SUMMARY OF THE INVENTION

In concordance with the instant disclosure, a method for coating fuel cell components with at least one of a hydrophilic coating and a hydrophobic coating to facilitate a removal of water from the fuel cell, the method being less complex and expensive, and providing a sufficient coating durability, is surprisingly discovered.

In one embodiment, a method for coating a fuel cell component includes the steps of: providing the fuel cell component; and forming a coating on a surface of the fuel cell component with a plasma jet.

In a further embodiment, the step of forming the coating on the surface of the fuel cell component includes the steps of: applying a coating precursor to a surface of the fuel cell component; and delivering a plasma jet to the coating precursor. The coating precursor is thereby caused to react and form the coating on the surface of the fuel cell component.

In another embodiment, the step of forming the coating on the surface of the fuel cell components includes the steps of: introducing a coating precursor to a plasma jet; and growing the coating on a surface of the fuel cell component by delivering the plasma jet to the surface of the fuel cell component.

DETAILED DESCRIPTION OF THE INVENTION

The following description is merely exemplary in nature and is in no way intended to limit the invention, its application, or uses. In respect of the methods disclosed, the steps presented are exemplary in nature, and thus, the order of the steps is not necessary or critical.

An illustrative fuel cell component for use with the method of the present disclosure is a fuel cell plate. In one embodiment, the fuel cell plate is substantially as described in co-pending U.S. application Ser. No. 11/696,361, hereby incorporated by reference in its entirety. Other fuel cell plate designs and configurations may also be coated according to the present method. Although the method of the disclosure is described herein below in relation to the fuel cell plate, it should be appreciated that the scope of the invention is not limited thereto. The method may further be applied to any fuel cell component where a particular hydrophobicity or hydrophilicity of a surface is desired. For example, the method may also be applied to a drainage component or the like employed in the fuel cell to facilitate a removal of water therefrom.

The fuel cell plate typically includes a plurality of inlet apertures, a plurality of outlet apertures, and a plurality of flow channels. The plurality of inlet apertures and the plurality of outlet apertures are adapted to transport reactant gases to and from, respectively, the plurality of flow channels. The plurality of flow channels define a plurality of lands that are formed therebetween. The plurality of flow channels and the plurality of lands form an active area of the fuel cell plate adjacent which an electrochemical fuel cell reaction occurs during the fuel cell operation. A feed area is disposed between one of the inlet and outlet apertures and the active area. It is understood that the size, shape, quantity, and type of fuel cell plates for a fuel cell or a fuel cell stack, as well as the configuration of the fuel cell plates within the fuel cell or the fuel cell stack, may vary as desired. For example, the fuel cell plate design may be based on parameters such as an amount of electricity desired to be generated, a size of a consumer of electricity to be powered by the fuel cell stack, a volumetric flow rate of reactant gases through the fuel cell stack, and other like factors as are known in the art. The fuel cell plates may be formed from any conventional material, such as graphite, a carbon composite, or a metal, for example. Other suitable materials may also be employed.

The fuel cell plate includes at least one of a hydrophobic coating and a hydrophilic coating disposed thereon. The hydrophobic coating may be formed from a hydrophobic material disposed on at least a portion of the fuel cell plate. As nonlimiting examples, the hydrophobic material may be one of a silane, silicon, an alkylsilane, a fluoroalkylsilane, a fluorocarbon, an alkoxide, a phenylethoxysilane, and a polydimethylsiloxane. In particular embodiments, the hydrophobic material employed in forming the hydrophobic coating is hexamethyl disiloxane (HMDSO), tetra ethoxy silane (TEOS), or 1,2 Bis (triethoxy silyl) (BTESE). Other suitable hydrophobic coatings may be selected as desired. As nonlimiting examples, the hydrophobic coating may have a contact angle of greater than about 120 degrees, in a particular embodiment greater than about 135 degrees, and in a most particular embodiment greater than about 150 degrees. A skilled artisan may select a desired level of hydrophobicity as desired.

The hydrophilic coating may be formed from a hydrophilic material disposed at least a portion of the fuel cell plate. Examples of suitable hydrophilic coatings include, but are not limited to, metal oxides. The hydrophilic material may be formed from a precursor having silicon, titanium, tin, Al, or other suitable hydrophilic material, as desired. The method of the disclosure can be used with any hydrophilic material suitable for use with a sol-gel process. In particular embodiments, the coating formed is one of a silica, titania, tin oxide, alumina or a mixture thereof. Other suitable hydrophilic coatings may be selected as desired. As nonlimiting examples, the hydrophilic coating may have a contact angle of less than about 10 degrees, in a particular embodiment less than about 5 degrees, and in a most particular embodiment less than about 1 degree. A skilled artisan may select a desired level of hydrophilicity as desired.

The method of the present disclosure includes the steps of providing the electrically conductive fuel cell plate and forming a coating, such as at least one of the hydrophilic coating and the hydrophobic coating, on a surface thereof with a plasma jet or plume. The hydrophilic coating and the hydrophobic coating of the fuel cell plate are adapted to optimize and facilitate a transport of liquid water away from the active area during an operation of the fuel cell. A stagnation of water on the fuel cell plate is thereby militated against.

An ionizing gas used to form the plasma jet typically includes compressed air, but the plasma jet may be formed from one or more of nitrogen, oxygen, and an inert gas, as desired. Further non-limiting examples of ionizing gases that may be employed to form the plasma jet include stored oxygen, and oxygen diluted in the inert gas, such as nitrogen, argon, or helium, for example. The plasma jet employed in forming the coating on the surface of the fuel cell plate may be produced by an air plasma (AP) device suitable for applying an open air plasma jet to a surface of the fuel cell plate. The AP device may be an atmospheric pressure air plasma (APAP) device. The AP device typically includes a voltage supply for supplying voltage to an electrode and a ground for grounding the AP device. The voltage is typically from about 100 V to about 400 V, and in a particular embodiment about 130 V to about 150V, although it should be appreciated that other voltages may be used as desired.

The ionizing gas is fed into the AP device through an inlet and is used to generate the plasma jet. The electrode generates the plasma jet from the ionizing gas that is projected through a plasma nozzle. The plasma jet exits the AP device via the plasma nozzle. The plasma nozzle may have an aperture adapted to effectively deliver the plasma jet to the surface of the fuel cell plate. As a nonlimiting example the aperture of the nozzle may be less than 5 mm in diameter, in particular embodiments less than 3.5 mm in diameter, and in a most particular embodiment less than about 2 mm in diameter. Other sizes of the nozzle aperture may be selected as desired.

The plasma jet is moved along the surface of the fuel cell plate. The AP device may apply the plasma jet along the surface of the fuel cell plate at a velocity of up to about 1000 mm/second. In one embodiment, the velocity of movement of the plasma jet is up to about 500 mm/second. In a particular embodiment, the plasma jet is applied at a velocity of about 10 mm/second. It should be appreciated that the delivery of the plasma jet to the surface of the fuel cell plate can be intermittently discontinued several times during an application. For example, raster patterns with spacings can be generated, wherein the plasma jet is intermittently discontinued to achieve a desired hydrophobic/hydrophilic coating pattern.

It should also be appreciated that a residence time of the plasma jet over the surface may be employed to control a thickness of the coating. An energy of the plasma may further be used to control the coating thickness. As nonlimiting examples, the coating thickness may range from about 0.05 micron to about 5 microns, in particular embodiments about 0.25 microns to about 2 microns, and in a particularly illustrative embodiment about 0.4 microns to about 1 microns. A skilled artisan may select other suitable thicknesses of the coating as desired.

In one embodiment, the forming of the coating on the fuel cell plate first includes the step of applying a coating precursor to the surface of the fuel cell plate. The step of applying the coating precursor may be performed by at least one of a spraying process, a dipping process, and a brushing process. Other suitable methods of applying the coating precursor may also be used. The plasma jet is then delivered to the coating precursor. The coating precursor is caused to react, such as by condensation polymerization, when placed in contact with the plasma jet and form the coating on the surface of the fuel cell plate. Other reactions useful in forming the coating may also be caused by the plasma jet. The steps of applying the coating precursor and reacting the precursor with the plasma jet may be repeated to obtain the desired coating thickness or pattern.

In one example, the fuel cell plate may be prepared according to the present disclosure by being dipped in hexamethyl disiloxane (HMDSO), tetra ethoxy silane (TEOS), hexamethyl disilazane (HMDSN), 1,2 Bis(triethoxy silyl) ethane (BTESE) or another suitable silica coating precursor. The coating precursor may either be allowed to dry prior to treating the fuel cell plate with the plasma jet, or treated directly with the plasma jet. The energy of the plasma jet may condense and polymerize the HMDSO, TEOS, HMDSN or BTESE into a hydrophilic coating on the surface of the fuel cell plate. The energy of the plasma jet is sufficient to remove the organic components of the coating precursor and result in a silicon oxide ($SiO_x$) hydrophilic coating formed on the fuel cell plate.

In another embodiment, the step of forming the coating on the fuel cell plate first includes the step of introducing the coating precursor to the plasma jet. For example, a coating precursor containing silicon, titanium, tin or aluminum, or a metal oxide thereof, may be funneled through a precursor delivery system controlling the flow rate thereof, metered into the energized plasma jet, and applied to the fuel cell plate. Other metal oxides may also be used. The coating precursor is typically provided in the form of a powder, liquid, or suspension. The interaction of the coating precursor with the plasma jet and the fuel cell plate may vary based on process parameters such as the coating precursor type, plasma jet composition, plasma jet flow rate, the amount of energy input into the plasma jet, a distance of the plasma nozzle from the fuel cell plate, and the like. Typically, the coating precursor is chemically vaporized in the plasma jet. The vaporized coating precursor then condenses on the surface of the fuel cell plate. The coating may thereby be grown by chemical vapor deposition on the surface of the fuel cell plate through the application of the plasma jet containing the vaporized coating precursor to the surface. The energy of the plasma jet vaporizes and condenses the coating precursor into a hydrophobic coating on the surface of the fuel cell plate. The hydrophobic coating includes substantially hydrophobic organic components. If the energy of the plasma jet is sufficient, the plasma jet may further remove the organic components and result in a hydrophilic coating formed on the fuel cell plate.

In a further embodiment, the present method includes the step of pre-treating the fuel cell plate with the energized plasma jet to remove organic materials therefrom. The fuel cell plate may thereby be cleaned, and in certain embodiments surface-activated, to enhance adhesion between the fuel cell plate and the coating.

The method of the present disclosure may further include a step of post-treating the hydrophobic coating with the plasma jet to render the coating hydrophilic. Without limiting the scope of the present disclosure to any particular theory, it should be appreciated that the energized plasma jet may remove hydrophobic organic components from the hydrophobic coating deposited on the fuel cell plate. The hydrophobic coating may thereby be converted to a hydrophilic coating. The energized plasma jet may also add functionality to the coating, such as by causing oxygen radicals generated from the air to react with the hydrophobic coating to produce hydroxyl groups. Similarly, sulfate, carboxylate, aldehyde, ketones, and other functional groups can be attached to the surface of the coating by using suitable reactive ionizing as, such as $H_2S$, $C_2H_2$, $O_2$, mixtures thereof, or the like.

Example

The following examples are merely illustrative and do not in any way limit the scope of the disclosure as described and claimed.

Samples were prepared according to the method of the present disclosure by first dipping 1"×1" Grade 304 stainless steel (SS 304) coupons in coating precursors of hexamethyl disiloxane (HMDSO), tetra ethoxy silane (TEOS), and hexamethyl disilazane (HMDSN), 1,2 Bis(triethoxy silyl) ethane (BTESE). The coating precursor was then dried for about two minutes. The sample coupons were then subjected to a plasma treatment with an open air plasma jet.

An AP device employed to produce the open air plasma jet was a commercially available Plasma Treat® AP device. The AP device had a nozzle size of about 2 mm. The plasma jet was moved along a surface of each of the coupons at a speed of about 10 mm/second. The open air plasma jet caused a chemical vapor deposition of a hydrophilic ($SiO_x$) coating from the HMDSO coating precursor onto the surface of the sample coupons. The sample coupons were then analyzed according to established methodology for each of the following: water contact angle; X-ray photoelectron spectroscopy (XPS), X-ray fluorescence (XRF); morphology; durability of water contact angle; and electrochemical stability.

The contact angles of the sample coupons were observed to be about 0 degrees. The sample coupons were then aged for eight (8) months under ambient conditions. The contact angles of the coupons after eight (8) months were less than about 5 degrees. The sample coupons were also soaked in a water bath for more than 500 hours. No significant change in the contact angle was observed after the sample coupons were soaked in the water bath. The contact angle testing indicated that the contact angle of fuel cell plates coated according to the present disclosure would remain sufficiently low during operation of a fuel cell stack.

The XPS testing confirmed that the hydrophilic coating formed on the surface of the sample coupons was silica. The XRF testing indicated that the hydrophilic coatings had a thickness between about 0.4 micron and about 1 micron.

Micrographs were taken by field emission scanning electron microscopy (FESEM) to evaluate the morphology of the coatings formed according to the method of the disclosure. The micrographs were taken at 1000×, 3000×, 10,000×, 30,000×, and 100,000× magnifications. Each of the micrographs indicated a similar morphology to the silica coatings produced according to known vacuum deposition methods. It is surprisingly discovered, however, that the silica density was greater with the coatings deposited according to the present method in comparison to silica coatings deposited by conventional methods.

Electrochemical measurements were also conducted. Sample bipolar plates were prepared according to the present method to have a silicon oxide ($SiO_x$) coating. The sample bipolar plates were assembled in a fuel cell stack at a pressure of 7 psig, and operated at a temperature of about 80° C., a humidity level of 100% RH, and fed hydrogen gas and air at a 3/3 stoichiometric ratio. The fuel cell stack was operated for up to about 1000 hours. High frequency resonance (HFR) and cell voltage measurements indicated that the coating was substantially stable in a typical fuel cell operating environment.

Although the aforementioned example is described in relation to silicon oxide ($SiO_x$) coatings, a skilled artisan should appreciated that other metal oxides, such as titanium oxide, tin oxide, and aluminum oxide may likewise be used according to the present method.

The employment of an AP device for depositing multifunctional coatings by a process other than sol-gel vacuum assisted deposition processes, for example, is surprisingly inexpensive. The presently described method is also less complex. The ability to rapidly provide hydrophilic/hydrophobic transitions by post treatment of hydrophobic coatings is particularly advantageous with the present invention, as the necessity of steps such as masking and the like to produce hydrophilic/hydrophobic transitions are minimized, As the coatings grown according to the method have substantially the same morphology as conventional vacuum deposition methods, and a greater density, it should be further appreciated that an overall performance and durability is improved with fuel cells having fuel cell components coated according to the present invention.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for coating a fuel cell plate, the method comprising the steps of:
   providing the fuel cell plate having inlet apertures, outlet apertures, and a plurality of flow channels;
   providing an atmospheric pressure air plasma (APAP) device, the APAP device generating a plasma jet from an ionizing gas including at least one of air, nitrogen, oxygen, and an inert gas, the APAP device including a voltage supply for supplying voltage to an electrode of the APAP device, wherein the voltage supplied to the electrode is between 130 V and 150 V, and the APAP device further including a plasma nozzle for projecting the plasma jet from the APAP device; and
   delivering the plasma jet to a surface of the fuel cell plate, wherein a silicon-containing coating is formed on the surface of the fuel cell plate by the plasma jet from the APAP device.

2. The method of claim 1, wherein the coating includes at least one of a hydrophilic coating and a hydrophobic coating.

3. The method of claim 2, wherein the hydrophilic coating has a contact angle of less than about 10 degrees and the hydrophobic coating has a contact angle of greater than about 120 degrees.

4. The method of claim 1, wherein the step of forming the coating includes the steps of:
   applying a coating precursor to the surface of the fuel cell plate; and
   delivering the plasma jet to the coating precursor to cause the coating precursor to react and polymerize the coating on the surface of the fuel cell plate.

5. The method of claim 4, wherein the step of applying the coating precursor includes at least one of a spraying process, a dipping process, and a brushing process.

6. The method of claim 4, wherein the step of reacting the coating precursor includes a condensation polymerization of the coating precursor.

7. The method of claim 4, wherein the coating precursor is one of hexamethyl disiloxane (HMDSO), tetra ethoxy silane (TEOS), hexamethyl disilazane (HMDSN), and 1,2 Bis (triethoxy silyl) ethane (BTESE).

8. The method of claim 4, wherein the steps of applying the coating precursor and reacting the precursor with the plasma jet are repeated.

9. The method of claim 1, wherein the step of forming the coating includes the steps of:
   introducing a coating precursor to the plasma jet; and
   growing the coating on the surface of the fuel cell plate by delivering the plasma jet to the surface of the fuel cell plate.

10. The method of claim 9, wherein the step of introducing the coating precursor to the plasma jet chemically vaporizes the coating precursor to provide a vaporized coating precursor.

11. The method of claim 10, wherein the coating is grown on the surface of the fuel cell plate by a condensation of the vaporized coating precursor.

12. The method of claim 1, further comprising the step of post-treating the coating with the plasma jet to render the coating hydrophilic, the post-treating removing hydrophobic organic components from the coating deposited originally with the plasma jet.

13. The method of claim 1, further comprising the step of pre-treating the fuel cell component with the plasma jet to clean the fuel cell plate prior to depositing the coating thereon.

14. The method of claim 1, wherein the coating is one of a silane, silicon, an alkylsilane, a fluorocarbon, a phenylethoxysilane, and a polydimethylsiloxane.

15. The method of claim 1, wherein the plasma nozzle is moved along the surface of the fuel cell plate at a velocity of up to about 1000 min/second.

16. The method of claim 1, wherein the plasma jet is intermittently discontinued while the plasma nozzle is moved along the surface of the fuel cell plate to form a raster pattern with spacings to achieve a hydrophobic/hydrophilic coating pattern.

17. The method of claim 1, wherein the fuel cell plate is formed from metal.

18. A method for coating a fuel cell plate, the method comprising the steps of:
   providing the fuel cell plate having inlet apertures, outlet apertures, and a plurality of flow channels;
   providing an atmospheric pressure air plasma (APAP) device, the APAP device generating a plasma jet from an ionizing gas including at least one of air, nitrogen, oxygen, and an inert gas, the APAP device including a voltage supply for supplying voltage to an electrode of the APAP device, wherein the voltage supplied to the electrode is between 130 V and 150 V, and the APAP device further including a plasma nozzle for projecting the plasma jet from the APAP device;
   applying a silicon-containing coating precursor to a surface of the fuel cell plate; and
   delivering the plasma jet to the silicon-containing coating precursor on the surface of the fuel cell plate to cause the silicon-containing coating precursor to react, wherein a silicon-containing coating is formed on the surface of the fuel cell plate by the plasma jet from the APAP device.

19. A method for coating a fuel cell plate, the method comprising the steps of:
   providing the fuel cell plate having inlet apertures, outlet apertures, and a plurality of flow channels;
   providing an atmospheric pressure air plasma (APAP) device, the APAP device generating a plasma jet from an ionizing gas including at least one of air, nitrogen, oxygen, and an inert gas, the APAP device including a voltage supply for supplying voltage to an electrode of the APAP device, wherein the voltage supplied to the electrode is between 130 V and 150 V, and the APAP device further including a plasma nozzle for projecting the plasma jet from the APAP device;

introducing a silicon-containing coating precursor to the plasma jet; and growing a silicon-containing coating on a surface of the fuel cell plate by delivering the plasma jet to the surface of the fuel cell plate and by moving the plasma nozzle along the surface of the fuel cell plate, wherein the silicon-containing coating is formed on the surface of the fuel cell plate by the plasma jet from the APAP device.

* * * * *